United States Patent [19]

Iuchi

[11] 4,435,092
[45] Mar. 6, 1984

[54] SURFACE TEMPERATURE MEASURING APPARATUS FOR OBJECT WITHIN FURNACE

[75] Inventor: Tohru Iuchi, Kawasaki, Japan

[73] Assignee: Nippon Steel Corporation, Tokyo, Japan

[21] Appl. No.: 285,192

[22] Filed: Jul. 20, 1981

[30] Foreign Application Priority Data

Jul. 25, 1980 [JP] Japan .................. 55-102114
Jun. 2, 1981 [JP] Japan .................. 56-84856

[51] Int. Cl.³ ............................ G01J 5/06; G01J 5/14
[52] U.S. Cl. .................................. 374/129; 250/338; 356/43; 374/124; 374/138
[58] Field of Search ............... 374/133, 112, 121, 139, 374/124, 125, 132, 2, 129, 126; 356/43, 44; 250/342, 352

[56] References Cited

U.S. PATENT DOCUMENTS

| | | | |
|---|---|---|---|
| 1,318,516 | 10/1919 | Wallis et al. | 374/125 |
| 2,565,249 | 8/1951 | Machler | 374/125 X |
| 2,963,353 | 12/1960 | Eastman | 356/43 X |
| 3,492,869 | 2/1970 | Toyota et al. | 374/132 X |
| 3,559,485 | 2/1971 | Hovis et al. | 374/125 |
| 3,746,873 | 7/1973 | Williams | 250/352 |
| 3,805,072 | 4/1974 | Goerens et al. | 250/342 |
| 3,862,574 | 1/1975 | Antoine et al. | 374/121 |
| 4,144,758 | 3/1979 | Rooney | 374/129 X |
| 4,172,383 | 10/1979 | Iuchi | 374/126 X |
| 4,348,898 | 9/1982 | Stan | 374/124 |

*Primary Examiner*—Daniel M. Yasich
*Attorney, Agent, or Firm*—Pollock, Vande Sande & Priddy

[57] ABSTRACT

A surface temperature measuring apparatus is arranged to comprise means for conducting a first radiant energy generated from an object to be measured, said energy conducting means being provided opposite to said object, and reference radiation source means provided to mask the influence of radiation noise from the furnace on a radiometer and to generate a second radiation whose level is substantially determinable, whereby the surface temperature of said object can be determined from the detected values of said first and second radiations.

8 Claims, 10 Drawing Figures

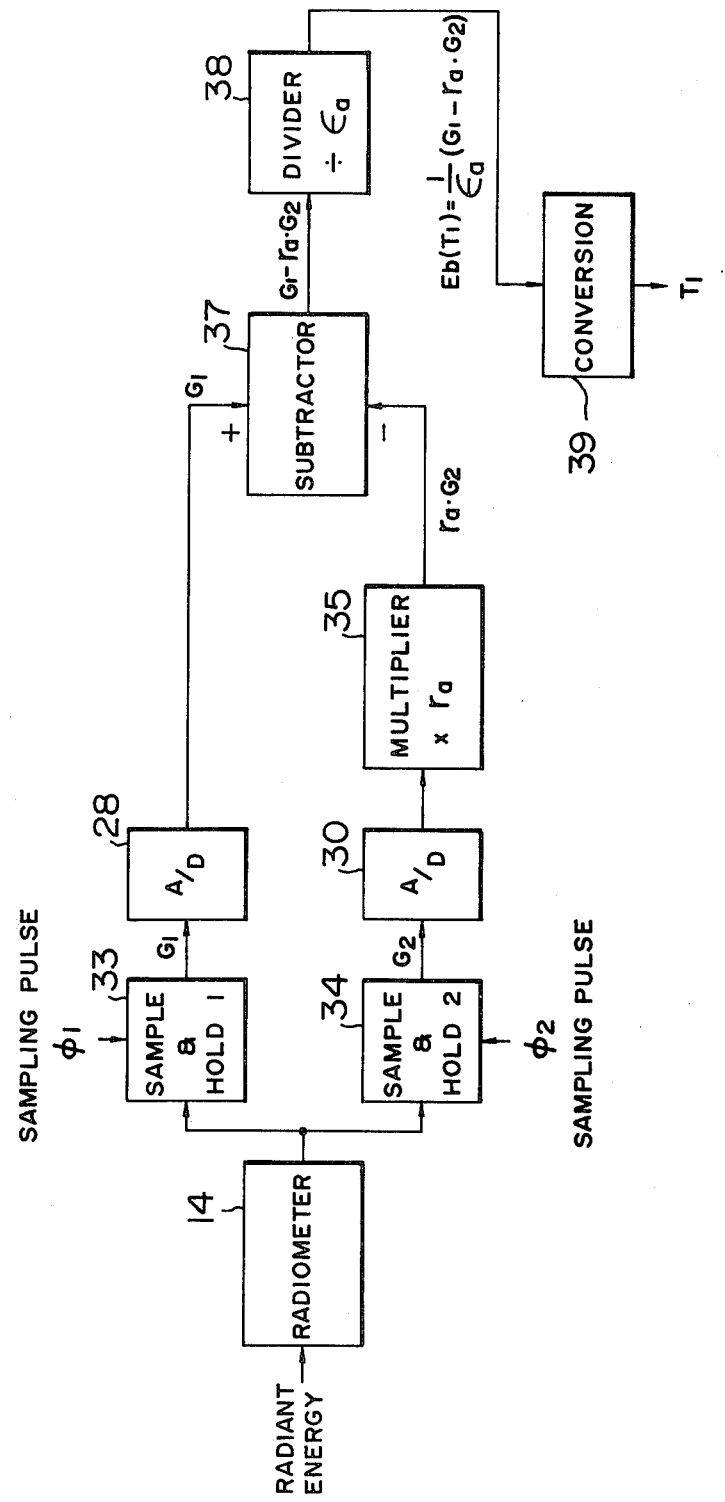

SURFACE TEMPERATURE MEASURING APPARATUS FOR OBJECT WITHIN FURNACE

DESCRIPTION

1. Technical Field

This invention relates to surface temperature measuring apparatus for an object within a high temperature furnace, and particularly to a surface temperature measuring apparatus using a radiation thermometer or radiometer and capable of measuring the surface temperature of the object substantially without being affected by the external radiation noise.

2. Background Art

In a high-temperature furnace, for example, a heating furnace preceding a hot strip rolling process, there has been great demand for a device to measure the surface temperature of an object such as a slab to be heated, continuously and accurately as possible.

In other words, if the surface temperature of the slab can be measured accurately, it will be possible just after the slab has reached a predetermined optimum temperature to remove it from the furnace and send it to the rolling stage. As a result, the heat control can be performed effectively and precisely, resulting in not only high quality of products but also saving of energy.

In the conventional method of measuring the surface temperature of a slab within a heating furnace, however, a thermocouple is placed in a protective tube extending into the heating furnace, to measure the ambient temperature within the furnace and provide a control signal for properly operating the heating furnace. Therefore, the temperature thus measured is not an accurate measure of the temperature of the slab because the temperature of the slab is not directly measured. For this reason, in the actual operation, the target for temperature of the slab is determined to be slightly higher than the predetermined optimum temperature or the slab is kept in the furnace for a time sufficiently longer than the standard heating time in order that the rolling process succeeding to heating of the slab is never unsuccessful due to insufficient heating of the slab. This results in wasteful energy consumption.

Although a contact-type thermometer is directly contacted to the slab to enable precise measurement of temperature of the slab, the thermometer is worn out by contacting the thermometer to the slab which is moving about within the heating furnace, so that such a manner of measurement is unsuitable for the continuous temperature measurement. Thus, there has been no practical way to determine the slab temperature other than by estimates based on the measurements of the ambient temperature.

In order to improve the measuring method, there have been proposed various radiation temperature methods generally suitable for the continuous temperature measurement. However, there are various problems to be solved on the measurement of the surface temperature of objects such as slabs which are transported within the heating furnace. For example, when the surface temperature of the slab transported within the furnace is required to be measured by a radiation thermometer which measures the heat radiation from the slab surface, it should be noted that the ambient temperature is much higher than the slab temperature because the slab is heated by the surrounding heat radiation. Although the radiation thermometer is surrounded by a heat shielding cylinder for shutting out the heat radiation from its surroundings, some radiant energy may enter into the thermometer from the surroundings thereby causing a measurement error. Such entrance of radiant energy from the surroundings into the thermometer with the shielding cylinder is called the stray radiation dependent noise component. Since the slab surface is usually rough due to its oxidized surface, the stray radiation dependent noise component from the surroundings is easily incident to the radiation thermometer due to the diffusive reflection. It is difficult to definitely locate the source of the stray component and quantify the effects thereof because of the diffusive reflecting property of the slab surface.

In order to minimize this stray radiation dependent noise component, or quantify the influence of the stray noise component, various different methods have been proposed so far. For example, in Japanese Patent Publication No. 47713/1978 entitled "Method and Apparatus for Measuring the Temperature of the Object within Furnace," the present applicant has proposed to provide a shielding mechanism within the furnace for shielding the stray component. This shielding mechanism is configured such a manner as to provide the abovementioned heat shielding cylinder with a disc fixed at its lower end opposite to the slab, and it is water-cooled so as not to radiate a great radiant energy. Therefore, the radiant energy from the shielding mechanism is prevented from reflecting from the surface of the slab and affecting the indication of the thermometer.

However, since the temperature of the atmosphere within the heating furnace is usually as high as 1000° C. above and the temperature of the slab is also high, the slab is cooled, when the slab is transported at a low speed and its surface is exposed to a relatively low temperature of the shielding plate for a considerably long time, resulting in undesirable decrease of the slab temperature. Moreover, a problem such as leakage of water may cause a dangerous accident.

DISCLOSURE OF THE INVENTION

It is an object of the invention to provide a surface temperature measuring apparatus for objects within a furnace, which is capable of high-precision continuous measurement of temperature without the abovementioned problems on the radiation temperature measurement.

In order to achieve the above object, this invention is based on the principle that since the noise component is difficult to be completely removed, a reference noise source with a known radiation level is used to mask an uncertain stray radiation dependent noise component so that the radiation thermometer is subjected to a constant noise of known level from the reference noise source instead of the uncertain stray radiation dependent noise component, and that the effect of the reference noise is arithmetically cancelled thereby obtaining the true temperature of the heated object.

According to the invention, the surface temperature measuring apparatus is arranged to comprise a shielding cylinder positioned opposite to an object the temperature of which is to be measured, within a furnace, said cylinder having at its side opposite to the object an end with an opening which allows passing of a first radiation emitted dependent on the temperature of the object, a reference radiation source means provided within the shielding cylinder to mask the effect of a radiant noise derived from the high-temperature atmosphere within the furnace and to generate a second radiation whose level is substantially determinable, and a radiation detecting means provided at another end of the shielding cylinder opposite to said opening end thereof so as to separately detect said first and second radiations, whereby the surface temperature of the object is determined by the values resulting from the detection of the first and second radiations.

BRIEF DESCRIPTION OF THE DRAWINGS

The objects, features and advantages of the present invention will be understood from the following description of preferred embodiments of the present invention with reference to the accompanying drawings, in which:

FIG. 5A is a block diagram of the arithmetic system for processing the output of a single scanning type radiometer;

BEST MODE FOR CARRYING OUT THE INVENTION

Figure 1:
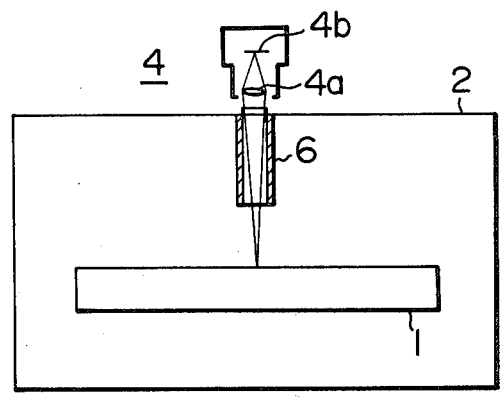
FIG. 1 is a schematic diagram of a conventional radiation-type temperature measuring apparatus.

Before the description of some embodiments of the invention, the construction of a conventional apparatus will first be described briefly with reference to FIG. 1. In FIG. 1, a slab or object 1 is heated by radiation heat from the inner wall of a heating furnace 2 while it is being transported in the direction perpendicular to the drawing. A radiation thermometer 4 is mounted on the upper wall of the furnace so as to receive the radiant energy from the slab 1 which is being transported, and includes a transducer 4b for converting the received radiant energy to an electrical signal, and an optical system 4a for focusing the radiant energy from the slab onto the transducer 4b. A heat-resistant shielding cylinder 6 is provided along the axis of the radiation which proceeds from the slab 1 to the radiation thermometer 4, in order that the radiation noise from the surroundings is not directly projected onto the radiation thermometer 4. Nonetheless, in the construction of the conventional temperature measuring apparatus, the radiation noise from the surroundings enters into the cylinder 6 by various causes and reaches the radiation thermometer 4. Since the incident noise level is generally not stable, uncertain error is caused in temperature measurement.

The purpose of the present invention is to remove the sources of the uncertain errors. One embodiment for this object is shown in FIG. 2.

In the temperature measuring apparatus of the described above, it is difficult to prevent the radiation noise from being transmitted to the radiation thermometer from the surroundings. The present invention is based on the principle that the uncertain radiation noise can be masked by a reference noise source having a radiation whose level is substantially determinable, while the radiation thermometer is subjected to the effects of the reference noise source instead of the uncertain radiation noise. This principle is disclosed in Japanese Patent Application No. 63469/1979 filed on May 22, 1979 and entitled "Surface Temperature Measuring Method for Objects within Furnace." This principle will hereinafter be described with reference to the embodiment of FIG. 2, in which like elements corresponding to those in FIG. 1 are identified by the same reference numerals. The shielding cylinder 6 has a disclike shielding plate 8 with an opening 10 as shown in FIG. 2A, mounted on its lower opening portion to oppose the slab 1 in parallel therewith with a spacing, H. Also, the shielding cylinder 6 has radiation thermometers 14 and 24 mounted on its upper portion. The radiation thermometer 14 is located to receive a radiation 16 from an inner surface 12 of the shielding plate 8, while the radiation thermometer 24 is located to receive a radiation 26 from the slab through the opening 10 of the shielding plate 8. The temperature error occurring on the radiation temperature measurement is a function of the wavelength, and temperature detected by the radiation thermometer, and proportional to the detected wavelength. Therefore, it is desired to make the wavelenth detected by the radiation thermometer as short as possible, for example, $\lambda=0.65$ $\mu$m. When the measuring temperature is high as 1000° C., the above wavelength is enough to give a satisfactory sensitivity in measurement. The emissivity $\epsilon_1$ of the slab 1 in the wavelength range as mentioned above is about 0.85 with small variation. Although the ambient temperature $T_3$ within the heating furnace 2 is higher than the temperature $T_1$ of the slab 1 and usually varies greatly depending on the firing condition, the radiation energy entered into the inside of the shielding cylinder 6 is reduced by virtue of the shielding plate 8 to a negligible amount. The surface 12' of the shielding plate 8 opposite to the slab 1, as well as its inner surface 12, serves as the above-mentioned reference noise source. The shielding cylinder 6 and shielding plate 8 are made of a good heat-resistant material sufficient to withstand higher temperatures than that of the slab 1 because they are necessarily heated within the furnace. For example, silicon carbide (SiC) can be used for the material because it has heat-resistivity against higher than 1400° C., high heat conductivity similar to carbon, small coefficient of thermal expansion and workability on machining. The emissivity of the cylinder 6 and plate 8 is about 0.8, as is well known, but can be increased to about 0.85 by roughening their surfaces.

Figure 2:
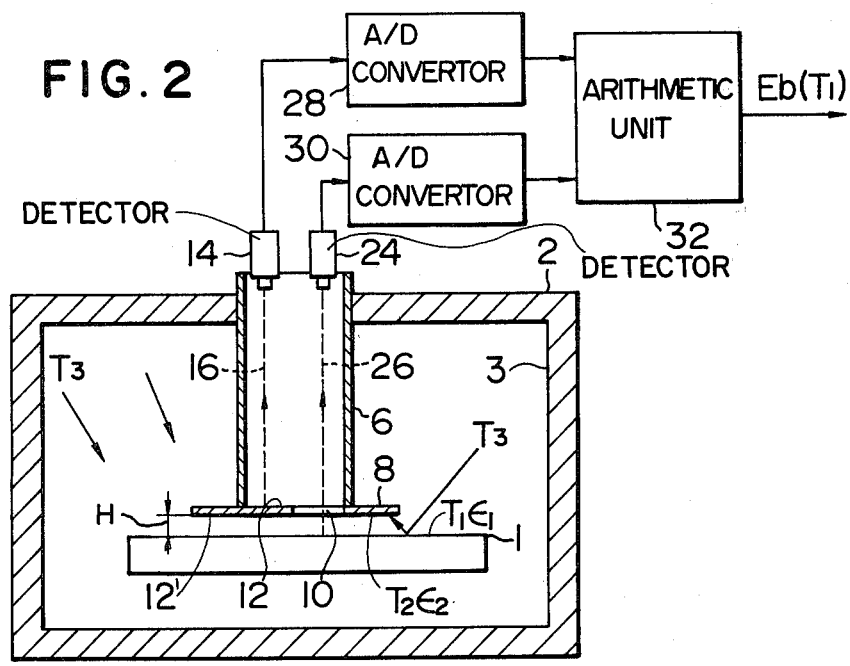
FIG. 2 is a diagram of one embodiment of the surface temperature measuring apparatus of the invention.
Figure 2A:
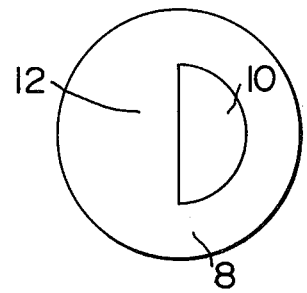
FIG. 2A is a plan view of the shielding plate in FIG. 2.

In the arrangement in FIG. 2, assume that the surface of the slab 1, whose temperature is to be measured, is called surface 1; the surface of the reference noise source facing to the surface 1, surface 12', and the inner wall surface of the furnace, surface 3. The effective radiant energy emitted from a unit area of the surface i is represented by $G_i(i=1, 12', 3)$, that is, $G_1$ is the effective radiant energy from the surface 1, $G_{12'}$ is that from the surface 12' and $G_3$ is that from the surface 3.

The temperature and emissivity of the slab 1 are respectively represented by $T_1$ and $\epsilon_1$, and those of the shielding plate 8 by $T_2$ and $\epsilon_2$, respectively. The inner walls of the furnace are regarded as a blackbody cavity at temperature $T_3$; that is, the emissivity $\epsilon_3$ of the inner walls of the furnace is regarded to be 1.0.

The radius of the shielding plate 8 is taken as R, and the distance therefrom to the slab as H. The effective radiant energy $G_i$ (i=1, 2, 3,) per unit area from the surfaces of the slab and the reference noise source, which are considered as diffusive reflecting surfaces, is generally given by $$G_i = \epsilon_i \cdot Eb(T_i) + (1 - \epsilon_i) \sum_{k=1}^{3} G_k \cdot F_{ik}, \quad (1)$$

where
  $Eb(T_i)$ is the radiant energy from a blackbody at temperature $T_i$; and
  $F_{ik}$ is the geometry coefficient indicating the ratio of radiation arrived from surface i to surface k, ($F_{jj}=0$, j=1,2).

If Eq. (1) is applied to the case of FIG. 2, the following expressions are derived:

$$G_1 = \epsilon_1 \cdot Eb(T_1) + (1-\epsilon_1)(G_2 F_{12} + G_3 F_{13}) \quad (2)$$

$$G_2 = \epsilon_2 \cdot Eb(T_2) + (1-\epsilon_2)(G_1 F_{21} + G_3 F_{23}) \quad (3)$$

$$G_3 = Eb(T_3) \quad (4)$$

Rearranging Eqs. (2) to (4) for $G_1$ will yield $$G_1 = \frac{\epsilon_1}{1 - (1-\epsilon_1)(1-\epsilon_2) F_{12} F_{21}} \cdot Eb(T_1) + \frac{(1-\epsilon_1)\epsilon_2 F_{12}}{1 - (1-\epsilon_1)(1-\epsilon_2) F_{12} F_{21}} \cdot Eb(T_2) + \frac{(1-\epsilon_1)\{F_{13} + (1-\epsilon_2) F_{23}\}}{1 - (1-\epsilon_1)(1-\epsilon_2) F_{12} F_{21}} \cdot Eb(T_3) \quad (5)$$

The $G_1$ in Eq. (5) shows the detected value of the combined effects of radiation from a plurality of sources, as measured with the radiation thermometer 24, the first term on the right hand side of the equation being the apparent radiation from the slab, the second term thereof is relating to the noise radiation from the reference noise, and the third term thereof relating to the stray radiation dependent noise component from the surroundings. Eq. (5) can be rewritten as $$G_1 = \epsilon a \cdot Eb(T_1) + \gamma a \cdot Eb(T_2) + \eta \cdot Eb(T_3) \quad (6)$$

where $$\epsilon a = \frac{\epsilon_1}{1 - (1-\epsilon_1)(1-\epsilon_2) F_{12} F_{21}}; \quad (7)$$

$$\gamma a = \frac{(1-\epsilon_1)\epsilon_2 F_{12}}{1 - (1-\epsilon_1)(1-\epsilon_2) F_{12} F_{21}}; \quad (8)$$

$$\eta = \frac{(1-\epsilon_1)\{F_{13} + (1-\epsilon_2) F_{23}\}}{1 - (1-\epsilon_1)(1-\epsilon_2) F_{12} F_{21}}; \quad (9)$$

$$F_{12} = F_{21} = \frac{1}{2}\left[2 + \left(\frac{H}{R}\right)^2 - \sqrt{\left\{2 + \left(\frac{H}{R}\right)^2\right\} - 4}\right]; \quad (10)$$

and;

$$F_{13} = F_{23} = 1 - F_{12}. \quad (11)$$

if $\eta$ in Eq. (6) can be made greatly small as compared with $\epsilon a$, $\gamma a$, the third term on the right-hand side can be neglected. Thus, the temperature of the slab can be determined by the following equation:

$$Eb(T_1) = \frac{1}{\epsilon a}\{G_1 - \gamma a \cdot Eb(T_2)\} \quad (12)$$

The truth of Eq. (11) can easily be understood as follows. Since $F_{11} + F_{12} + F_{13} = 1$ and $F_{11} = 0$ in the model of FIG. 2, the equation of $F_{13} = 1 - F_{12}$ can be satisfied. Moreover, if the area of the shielding plate 8 is made large enough, the area of the opening portion 10 is negligible, and the mutual reflection can be considered to occur between the discs of radius R and distance H therebetween. Thus, the truth of $F_{12} = F_{21}$ of Eq. (10) can also be understood easily.

In Eq. (12), $\epsilon a$ is the function of the emissivities $\epsilon_1$ and $\epsilon_2$ of the slab 1 and shielding plate 8 and is considered to have a known value since $\epsilon_1 = \epsilon_2 \div 0.85$ as described above. The other coefficients, size of the shielding plate and the distance H between the shielding plate and slab can be considered to be known values determined by the configuration of the apparatus. Therefore, $Eb(T_1)$ and hence the slab temperature $T_1$ can be determined from $G_1$ and $Eb(T_2)$. The $Eb(T_2)$ corresponds to the sole effect of the radiant energy $G_2$ from the shielding plate 8 since the region surrounded by the shielding plate 8 and the shielding cylinder 6 is considered to be a black body furnace. In the embodiment of FIG. 2, the radiant energy $G_2$ is detected by the radiation thermometer 14. In this case, Eq. (12) results in $$Eb(T_1) = \frac{1}{\epsilon a}(G_1 - \gamma a G_2) \quad (13)$$

In accordance with the principle of this invention, in order to further reduce the effect of the stray radiation dependent noise component from the inner wall of the furnace as the noise source, two countermeasures are considered:

(1) The ratio of H/R is made as small as possible, i.e., the shielding plate 8 as the reference noise source has its radius made large and is positioned as close to the slab 1 as possible. This is effective to increase the area of the shielding plate and decrease the height of the mouth through which the stray noise enters, thereby to shut off the stray noise. This corresponds to making $F_{12}$ in Eq. (10) close to 1. When all the geometry coefficients in Eq. (9) are expressed by $F_{12}$ according to Eq. (11) and then the coefficients $F_{12}$ in the equation are all made close to 1, it will be seen that $\eta$ decreases. If the value of H is made very small, it may cause a problem in slab manipulation, but no disturbance on slab temperature such as disturbance by cooling even if the reference noise source is located close to the slab, because it is kept at a high temperature comparable to that of the slab 1.

(2) The emissivity $\epsilon_2$ of the reference noise source is made close to 1.0. This qualitatively results in the increase of absorption of the stray noise component by the shielding plate 8 and hence in the decrease of the effect of the stray noise component. If $\epsilon_1$ in Eq. (9) is made close to 1, the numerator decreases and the denominator increases, resulting in decrease of $\eta$.

In order to determine the slab temperature $T_1$ from Eq. (13), for example, the values $G_1$ and $G_2$ measured by the radiation thermometers 24 and 14 are converted to digital values by analog to digital (A/D) converters 30 and 28 and then the computation of Eq. (13) is performed by an arithmetic unit 32 for $Eb(T_1)$. Since the radiation thermometer used has a natural relationship between $T_1$ and $Eb(T_1)$ depending on the wavelength for the detector element and the filter, the $T_1$ can be determined easily by the graph of the relationship. Alternatively, the values of $T_1$ for different values of $Eb(T_1)$ determined on the basis of the relationship between $Eb(T_1)$ and $T_1$, are preliminarily stored in a memory map provided in the arithmetic unit 32, and the value of $T_1$ is determined directly by the arithmetic device.

Figure 3:
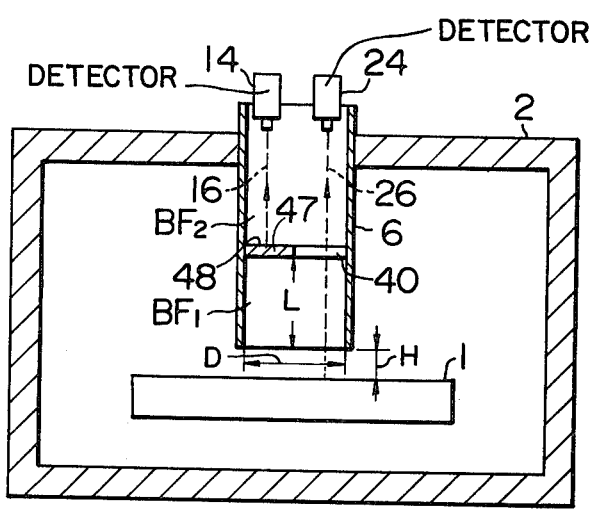
FIG. 3 shows a main arrangement of another embodiment of the invention.

FIG. 3 shows another embodiment, in which like elements corresponding to those in FIG. 2 are identified by the same reference numerals. In this embodiment, a shielding plate 47 with an opening 40 is provided within the cylinder 6, to partition the inside of the shielding cylinder 6 into two parts, $BF_1$ and $BF_2$. The inner surface of the shielding cylinder 6 and the surface 48 of the shielding plate 47 are made black and roughened, and the ratio, L/D of the length L to diameter D of each part is selected to be 1 to 5 or above, so that the parts $BF_1$ and $BF_2$ desirably satisfy the conditions for the black body furnace. Moreover, the distance H between the lower end of the shielding cylinder 6 and the slab 1 is made small enough to shut off the radiation noise from the furnace wall into the cylinder 6.

Figure 4:
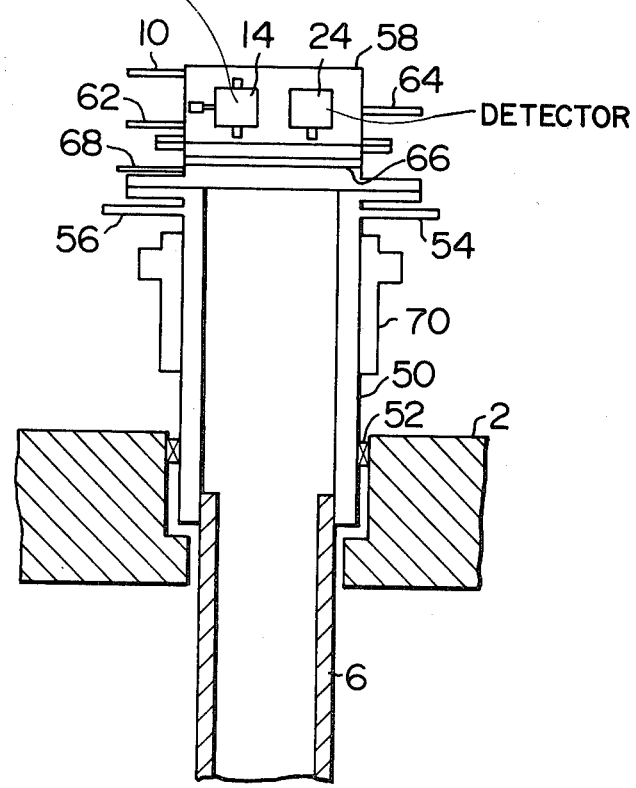
FIG. 4 is a cross-sectional view of part of the shielding cylinder on which radiation thermometers in the embodiments of FIG. 2 or FIG. 3 are mounted.

FIG. 4 shows one example of the way in which the shielding cylinder 6 is provided within the furnace and the radiometers 14 and 24 are mounted. A cooling cylinder 50 is fastened on the top of the cylinder 6 to project from the furnace 2. A sealing material 52 serves to prevent the leakage of the atmosphere out of the furnace 2. Reference numerals 54 and 56 represent supply and drain pipes for cooling water, and 58 a housing including the radiometers 14 and 24 and having mounted thereon supply and drain pipes 60 and 62 and a purge gas supply pipe 64. Reference numeral 66 denotes a filter, 68 a purge gas supply pipe for keeping the surface of the filter 66 clean, and 70 a component of the driving device for raising and lowering the shielding cylinder 6 to adjust the H depending on the size of the slab.

When the shielding cylinder 6 is heated by a high temperature atmosphere within the furnace 2 which is mounted with the components as described above, the shielding cylinder can be set to provide a small distance H from the slab 1 to be measured for its temperature and two radiant energies $G_1$ and $G_2$ can be detected stably without leakage of the atmosphere out of the furnace.

Figure 5:
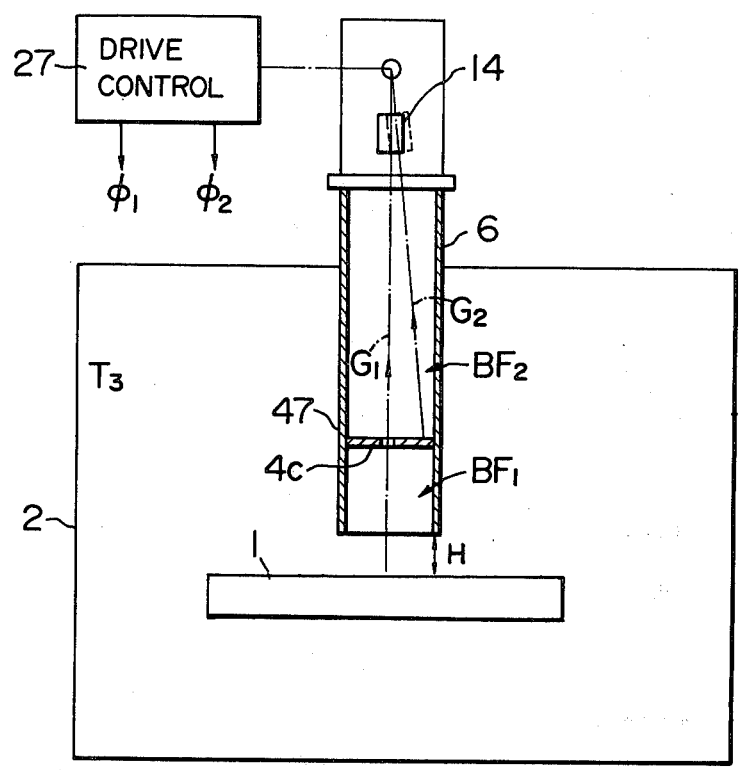
FIG. 5 shows the arrangement of still another embodiment of the invention.

FIG. 5 shows still another embodiment, in which a single scanning type radiometer is used to measure the radiant energy $G_1$ from the slab 1 and the radiant energy $G_2$ from the reference radiation source alternately. The scanning-type radiometer 14 may be mounted swingably between the positions indicated by solid and broken lines as, for example, shown in FIG. 5 and oscillated with a constant period by a drive control apparatus 27.

Figure 6:
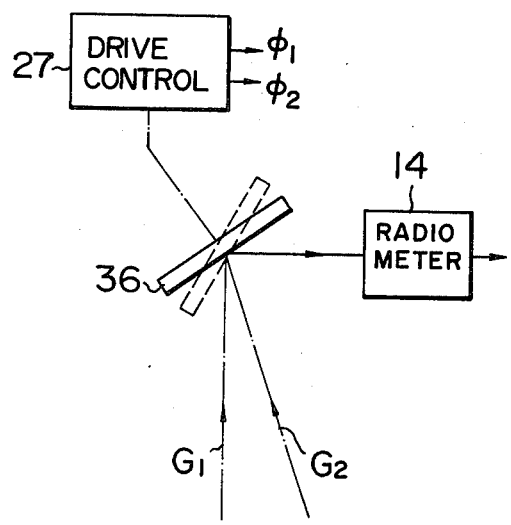
FIG. 6 shows another arrangement of the scanning-type radiometer used in the embodiment of FIG. 5.

There are used different kinds of scanning-type of radiometers. While the pivotally receprocating radiometer is used in the embodiment of FIG. 5, a horizontally oscillating radiometer may be used to move between positions corresponding to the positions at which the radiometers 14 and 24 are located in the embodiment of FIG. 2. Also, a radiometer utilizing the mirror reflection may be used as shown in FIG. 6. That is, a reflecting mirror 36 is mounted to be pivotable between the positions indicated by solid and broken lines and the radiometer 14 is fastened. The reflecting mirror 36 at the solid-line position reflects the radiation $G_1$ toward the radiometer 14 and, at the broken-line position, reflects the radiation $G_2$ toward the radiometer 14.

Moreover, since a single scanning type radiometer as described detects radiations $G_1$ and $G_2$, there is no measurement error which would occur due to the difference between the characteristics of two radiometers, if used for the detection of both the radiations.

The output of the radiometer 14 can be arithmetically processed by a common arithmetic system. The block diagram of FIG. 5A shows one example of the common arithmetic system, which may be applied to either one of the cases of FIGS. 5 and 6.

The radiant energy detected by the radiometer 14 is converted into electrical signals $G_1$ and $G_2$ by sample-and-hold circuits 33 and 34, respectively to which sampling pulses $\phi_1$ and $\phi_2$ are supplied from the drive control apparatus 27 in synchronism with the oscillation swinging of the radiometer shown in FIG. 5 or the oscillating scanning of the reflecting mirror 36 shown in FIG. 6. The signals $G_1$ and $G_2$ are then converted to digital signals by A/D converters 28 and 30, respectively. The signal $G_2$ is further multiplied by $\gamma a$ at a multiplier 35 to become $\gamma a \cdot G_2$, which is applied to a subtractor 37 together with the signal $G_1$. Thus, the subtractor 37 generates $G_1 - \gamma a \cdot G_2$, which is then divided by $\epsilon a$ at a divider 38. The output signal from the divider 38 is expressed by $Eb(T_1) = (1/\epsilon a)(G_1 - \epsilon a \cdot G_2)$, which can be reversely converted to determine the temperature $T_1$ of an object to be measured, from a characteristic curve or data of $T_1$ and $Eb(T_1)$.

Figure 7:
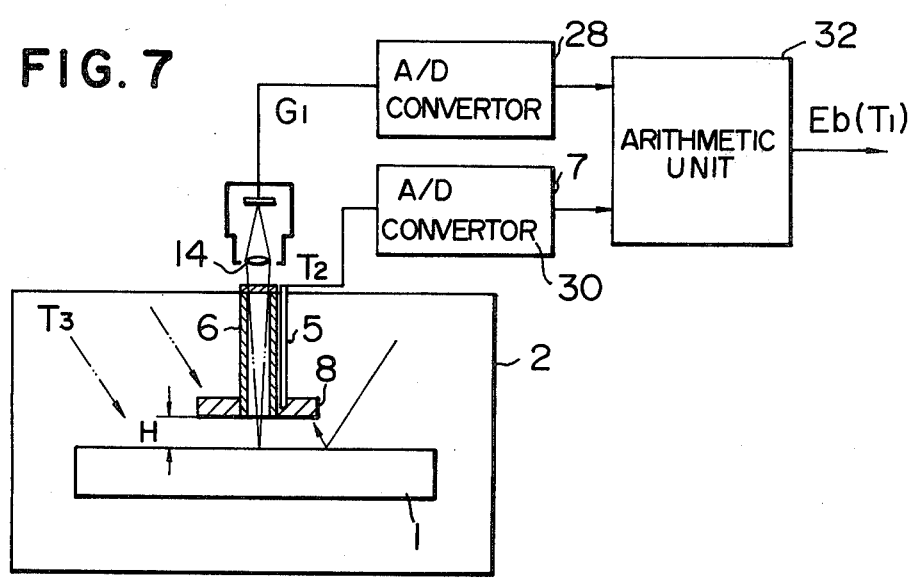
FIG. 7 shows further embodiment of the invention for relatively low-temperature measurement.
Figure 8:
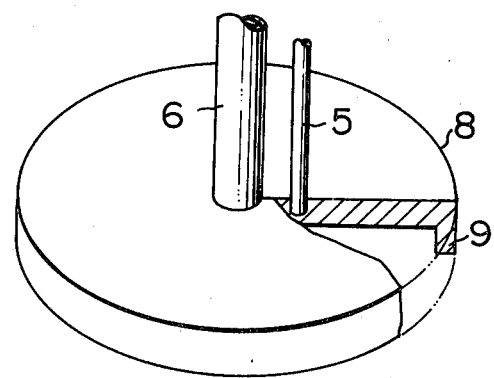
FIG. 8 is a partially cut-away view of the shielding plate of different configurations in the embodiment of FIG. 7.

While the radiant energy from the reference radiation source, $Eb(T_2) = G_2$ is directly measured by a radiometer as in the above embodiments, the $Eb(T_2)$ may be determined from the measurement of the temperature $T_2$ of the reference radiation source by use of a thermocouple when the $T_2$ is relatively low. FIG. 7 shows the embodiment therefor, in which the shielding plate 8, shielding cylinder 6 and so on are of the same construction as in the embodiment of FIG. 2. However, the inner diameter of the shielding cylinder 6 is made small, and the shielding plate 8 is of a circular ring surrounding the opening end of the shielding cylinder 6 as shown in FIG. 8 and part of the plate 8 can have the operation end of the thermocouple embedded therein. While the shielding plate 8 as shown in FIG. 8 has provided a projection edge portion 9 projecting downward from the outer periphery thereby to increase $\epsilon_2$, the projection edge portion 9 may be omitted to be of a disc-like shape.

When the measured values of $G_1$ and $T_2$ are converted from analog to digital values, each conversion rate is of course established so that the levels of both are values of the same unit, or radiant energy or temperature unit.

The apparatus according to the invention, as described above, is capable of non-contact continuous measurement of temperature with high precision and has other various advantages.

The principle of the invention is very simple and clear to be understood with ease, and the apparatus according to the invention can be practically used in the field.

Moreover, since the outputs $G_1$ and $G_2$ from the radiation thermometer can be processed in accordance with a simple arithmetic equation (12), the real time processing can be performed by a simple system.

In addition, since the detection wavelength can be short, an inexpensive silicon photoelectric transducer can be used as a sensor for the thermometer.

Moreover, while the temperature $T_2$ of the reference noise source is reached by natural heating within the furnace as described above, the reference noise source itself may be heated positively by the internal heating or temperature-controlled for keeping at a known temperature.

While silicon carbide is used for the material of the shielding plate as the reference noise source, alumina, or heat resistant steel, for example may be used similarly.

While the slab-heating furnace for use with the invention is described in detail as above, other high-temperature furnaces than the slab-heating furnace may of course be used similarly.

Moreover, the present invention can clearly be applied to a relatively low-temperature measurement of an object other than the slab, for example, hot-rolled plate, cold-rolled steel sheet or stainless steel sheet. In this case, however, it is difficult to use the silicon cell from the detection capability point of view, and thus it is necessary to use a detection element for longer wavelength, for example, Ge, PbS, PbSe or thermister bolometer.

What we claim is:

1. An apparatus for measuring the surface temperature of an object being heated in a furnace, said apparatus comprising:
    a shielding cylinder having a substantially closed end and an open end, said shielding cylinder being adapted to be disposed with said open end facing toward the object within a furnace; and a shield plate fixed to said shielding cylinder and formed at its portion facing toward the object with an opening communicating the exterior of said shielding cylinder with the interior thereof, so as to allow a first radiation emitted depending on the surface temperature of the object to enter said shielding cylinder and pass toward said outer end;
    said shielding cylinder being configured and adapted to be positioned relative to the object to block a second radiation emitted depending on the high temperature atmosphere within the furnace from entering said shielding cylinder, and said shield plate being configured to serve as a reference radiation source means for emitting from its inner wall portion disposed within said cylinder and from its outer wall portion facing toward the object, a third radiation which, on the one hand, is directed from said inner wall portion toward said closed end and, on the other hand, is directed from said outer wall portion and combined with said first radiation entering said shielding cylinder means, whereby the combined effects of said first and third radiations enter said shielding cylinder through said opening;
    radiation detecting means provided at said closed end of said shielding cylinder for separately detecting said combined effect of said first and third radiations and a sole effect of said third radiation; and
    means for determining the surface temperature of said object from the values of said combined effect and said sole effect detected by said detecting means.

2. An apparatus for measuring surface temperature, according to claim 1, wherein said radiation detecting means includes a scanning-type radiometer for detecting said combined effect and said sole effect.

3. An apparatus for measuring surface temperature according to claim 1, wherein said radiation detecting means includes a first radiometer for detecting said combined effect and a second radiometer for detecting said sole effect.

4. An apparatus for measuring surface temperature according to claim 1, 2 or 3, wherein said shield plate is extended substantially in parallel with the surface of said object.

5. An apparatus for measuring surface temperature according to claim 4, wherein said sole effect is a radiation generated from the inner surface of said shield plate.

6. An apparatus for measuring surface temperature according to claim 1, 2 or 3, wherein said shield plate partitions the interior of said shielding cylinder into a first section including said open end and a second section including said closed end.

7. An apparatus for measuring surface temperature according to claim 6, wherein said third radiation is a radiation generated from the surface of said shield plate facing said second section.

8. An apparatus for measuring the surface temperature of an object being heated in a furnace, said apparatus comprising:
    a shielding cylinder having a substantially closed end and an open end, said shielding cylinder being adapted to be disposed with said open end facing toward the object within a furnace; and a shield plate fixed to said shielding cylinder and formed at its portion facing toward the object with an opening communicating the exterior of said shielding cylinder with the interior thereof, so as to allow a first radiation emitted depending on the surface temperature of the object to enter said shielding cylinder and pass toward said outer end;
    said shielding cylinder being configured and adapted to be positioned relative to the object to block a second radiation emitted depending on the high temperature atmosphere within the furnace from entering said shielding cylinder, and said shield plate being configured to serve as a reference radiation source means for emitting from its inner wall portion disposed within said cylinder and from its outer wall portion facing toward the object, a third radiation which, on the one hand, is directed from said inner wall portion toward said closed end and, on the other hand, is directed from said outer wall portion and combined with said first radiation entering said shielding cylinder means, whereby the combined effects of said first and third radiations enter said shielding cylinder through said opening;
    radiation detecting means including a radiometer provided at said closed end of said shielding cylinder for detecting said combined effect of said first and third radiations and a thermocouple for detecting the temperature of said reference radiation source means; and
    means for determining the surface temperature of the object from the detected values of said combined effect and the temperature of said reference radiation source means.

* * * * *